United States Patent [19]

Martino et al.

[11] Patent Number: 5,111,336

[45] Date of Patent: May 5, 1992

[54] FILM ACCUMULATOR

[75] Inventors: Ronald J. Martino, Geneva; Frederick J. Ramsey, deceased, late of Rochester, by Helen F. Ramsey, Rochester, Administratrix, both of N.Y.

[73] Assignee: Leica Inc., Buffalo, N.Y.

[21] Appl. No.: 649,557

[22] Filed: Feb. 1, 1991

[51] Int. Cl.⁵ .................. G03B 1/18; G02B 21/22; G02B 27/02

[52] U.S. Cl. .................. 359/378; 359/469; 226/118; 226/119; 242/181

[58] Field of Search ............... 350/507, 514, 515, 516, 350/519, 529, 530, 531, 534, 536, 574, 577; 242/180, 181; 226/118, 119; 362/97; 359/368, 375, 376, 377, 378, 391, 392, 393, 396, 466, 467, 468, 469, 472

[56] References Cited

U.S. PATENT DOCUMENTS

| | | | |
|---|---|---|---|
| 1,605,842 | 11/1926 | Jones | 226/119 |
| 2,866,382 | 12/1958 | Gruner et al. | 350/517 X |
| 3,583,619 | 6/1971 | Sheperd | 226/119 X |
| 3,911,263 | 10/1975 | Ronsse, Jr. | 362/97 X |
| 3,942,190 | 3/1976 | Detwiler | 226/119 X |
| 4,009,814 | 3/1977 | Singh | 226/119 X |
| 4,292,663 | 9/1981 | Martino et al. | 362/97 |
| 4,420,121 | 12/1983 | Shawcross et al. | 242/181 |

Primary Examiner—Constantine Hannaher
Assistant Examiner—Edward J. Glick
Attorney, Agent, or Firm—Bean, Kauffman & Spencer

[57] ABSTRACT

A film accumulator having a fixed set of rollers and a moveable set of rollers to provide a serpentine path for accumulating film during photo interpretation is disclosed. The accumulator permits a substantially planer path for loading when the moveable rollers are located below the fixed rollers and a serpentine path for accumulating film when the moveable rollers are above the fixed rollers.

11 Claims, 5 Drawing Sheets

Fig. 5.
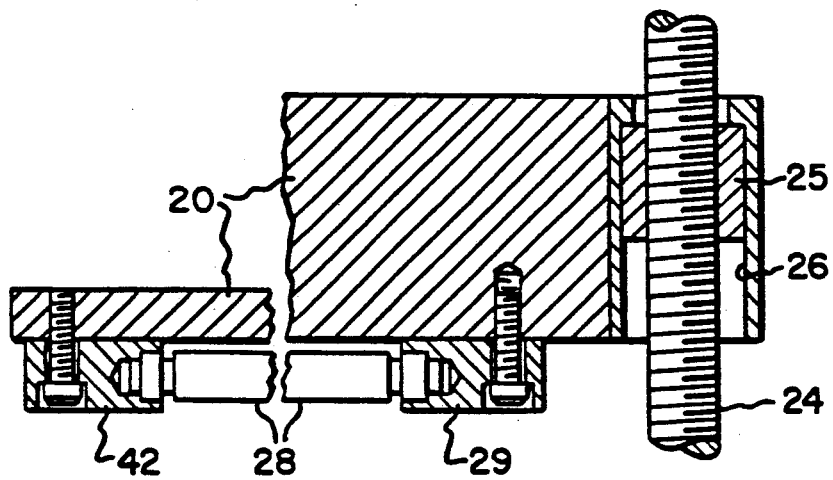
Fig. 6.
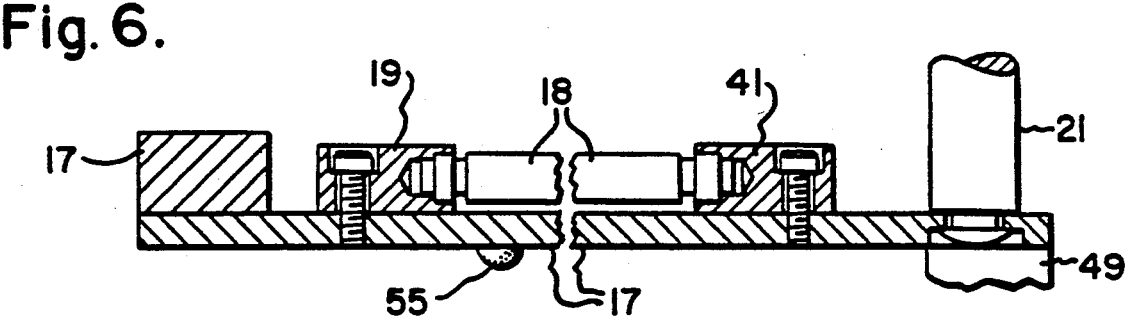
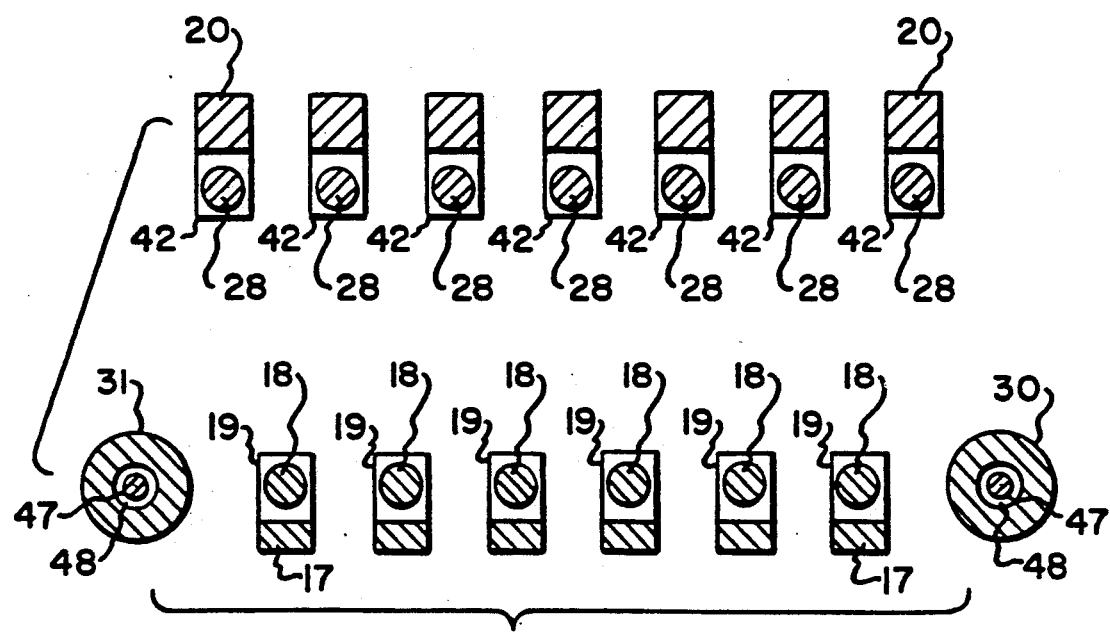
Fig. 7.

FILM ACCUMULATOR

BACKGROUND OF THE INVENTION

The present invention is directed to film accumulators and more particularly to film accumulators used in conjunction with photo interpretation microscopes; commonly referred to as a stereomicroscope.

Photo interpretation microscopes are usually mounted on a device referred to as a light table such devices provide illumination to assist in viewing details recorded on photographic film and to assist in supporting the photographic film during photo interpretation and/or analysis. Such light table are well known, conventionally support the photo interpretation microscope and provide various devices acting as supports for rolls of film prior to being viewed as well as take up devices to store the film after viewing.

A number of well known procedures are used for obtaining aerial photographs used for photo interpretation. One common procedure provides for a single camera taking a plurality of exposures. Such cameras are commonly mounted on moving vehicles such as airplanes and produce a panoramic view of the ground across the direction of movement. Frequently, a single picture, or frame, will be more than two feet long. Thus the spacing between comparable positions on sequential pictures is usually beyond the limits of extension of the rhomboid arms of photo comparison microscopes and some form of film accumulation is required between the rhomboid arms to permit simultaneous viewing.

A prior art film accumulator was positioned below the light table and was accessed through a slot in the table. This type of accumulator provided either a long take-up or a short take-up of film by choosing one of several predetermined paths through non-adjustable rollers positioned below the light table. Thus the film proceeded from the feed reel; across the top of the table; down through a slot in the table; around one or more rollers and then back up through the slot to the top of the table and continued across the table to the take-up reel. Devices of this type have several disadvantages. One obvious disadvantage is the inconvenience of having to thread the film around the various rollers below the table. Also, a further disadvantage of this prior art accumulator resides in having a slot traversing the light table when the film accumulation feature is not needed. Still another disadvantage of this prior art form of film accumulation results from the requirement to move the microscope instead of the table surface for mensuration. A further disadvantage results in less mensuration accuracy because of the distance which is necessary between the measuring system and the film being measured.

U.S. Pat. No. 3,879,107 is illustrative of a stereo microscope used for image analysis and U.S. Pat. Nos. 4,455,592 and 4,455,593 are illustrative of light table used in combination with photo interpretation microscopes.

U.S. Pat. No. 4,420,121 issued Dec. 13, 1983 illustrates a film accumulation device using a zig-zag pattern across the table surface. Variations in the amount of film to be accumulated are accomplished by varying the position of at least one of the roller assemblies providing the zig-zag pattern.

BRIEF DESCRIPTION OF THE INVENTION AND DRAWINGS

An accumulator is located above the light table having a set of fixed rollers and a set of movable rollers, the amount of film accumulated between one objective looking at a selected portion of a long strip of film and a second objective looking at another portion of the long strip of film may be varied. The movable set of rollers permit the film to be fed through the accumulator in a straight path when they are positioned on one side of the fixed set of rollers and provides a serpentine path for the film when positioned at a chosen location on the other side of the fixed set of rollers. The length of the serpentine path for the film may be varied by moving the movable set of rollers closer or further away from the fixed set of rollers.

FIG. 5 is a sectional view along lines 5—5 of FIG. 2;

FIG. 6 is a sectional view along lines 6—6 of FIG. 2;

FIG. 7 is a sectional view along lines 7—7 of FIG. 2;

DESCRIPTION OF THE PREFERRED EMBODIMENT

Figure 1:
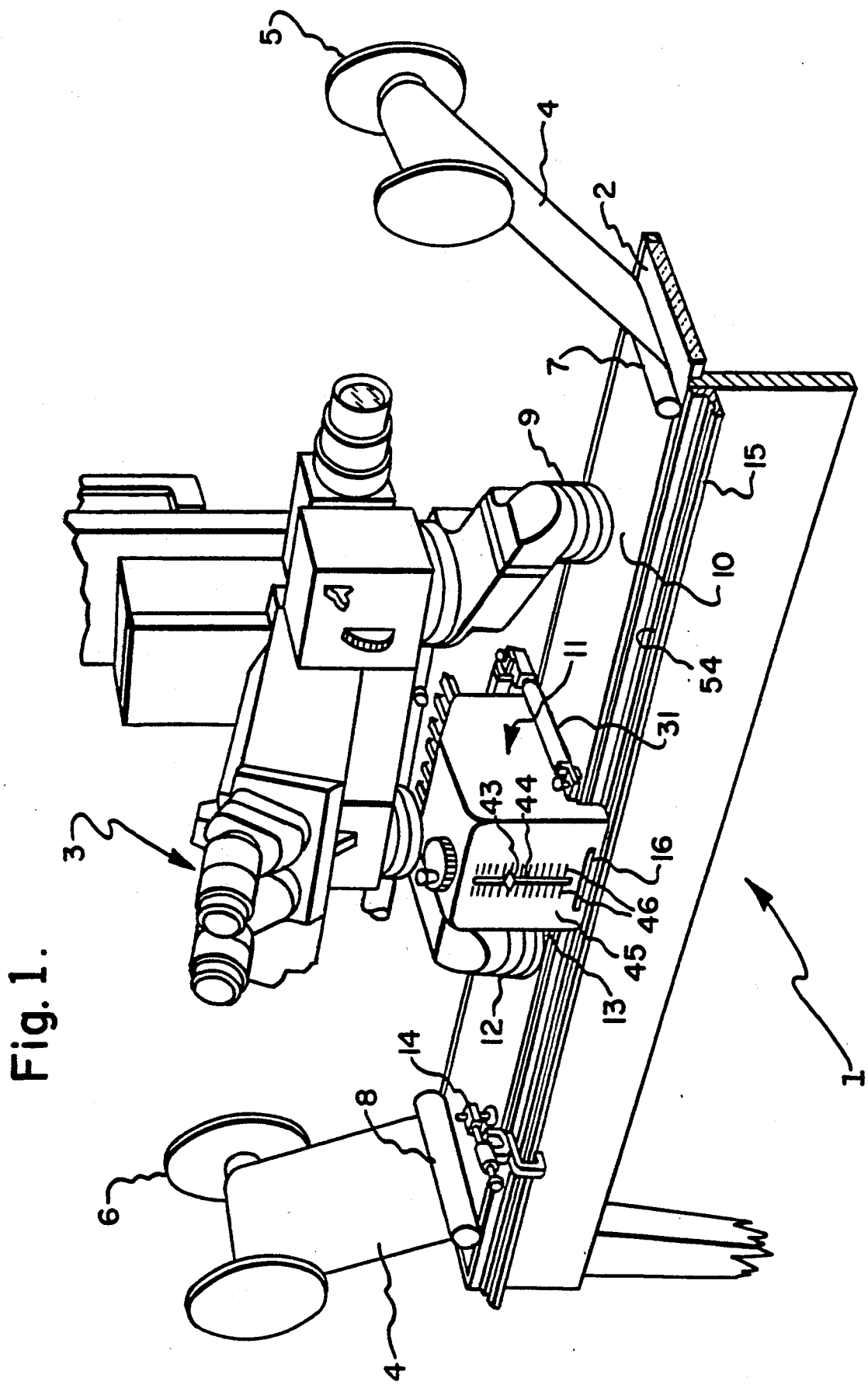
FIG. 1 is a perspective view showing a photo interpretation microscope, light table and film accumulator.

Referring to FIG. 1, a light table 1 has a moveable film stage 2 transparent to light from a source (not shown) thereunder. Film 4 is passed between a first reel 5 and second reel 6 in order to pass the portion of the film to be observed across film stage 2 of table 1 with rollers 7 and 8 maintaining film 4 in close proximity to film stage 2. First objective 9 is positioned above a pertinent portion of a first frame 10 of film 4 with, film 4 then passing through accumulator 11 and below a second objective 12, which is similarly positioned above a complementary portion of second frame 13. It is noted that first frame 10 and second frame 13 need not be adjacent frames of the film. Releasable film lock 14 is used to maintain the position of film 4 fixed relative to film stage 2 during setup, scanning, mensuration and any other operations that require the film stage to be moved. Release 16 is used to hold accumulator 11 in a selected position along guide 15 in order to maintain the accumulator position fixed relative to the stationary portion of table 1 and microscope 3 during such setup, scanning and mensuration operations.

Figure 2:
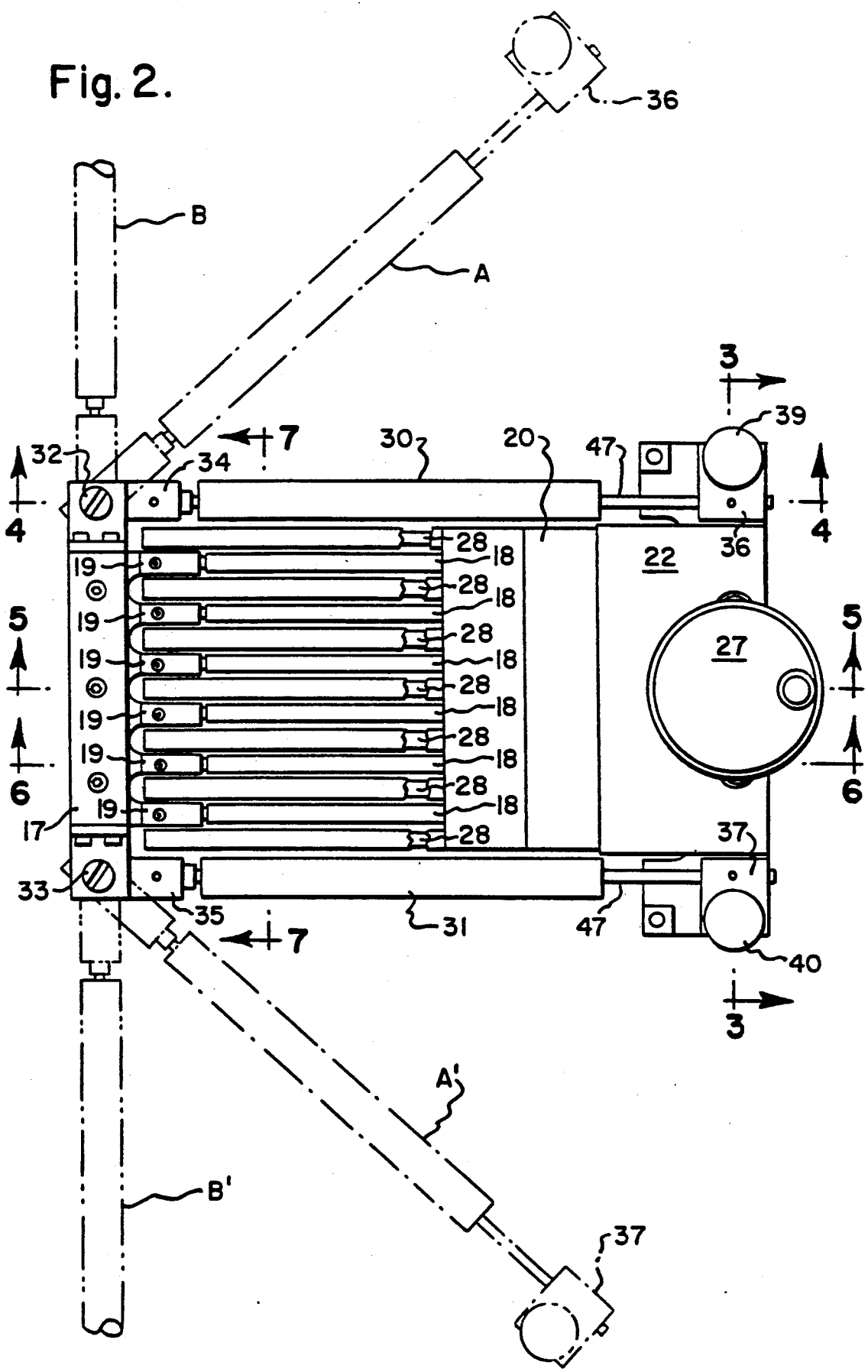
FIG. 2 is a top plan view (with the cover removed) of a film accumulator according to the present inventions.
Figure 3:
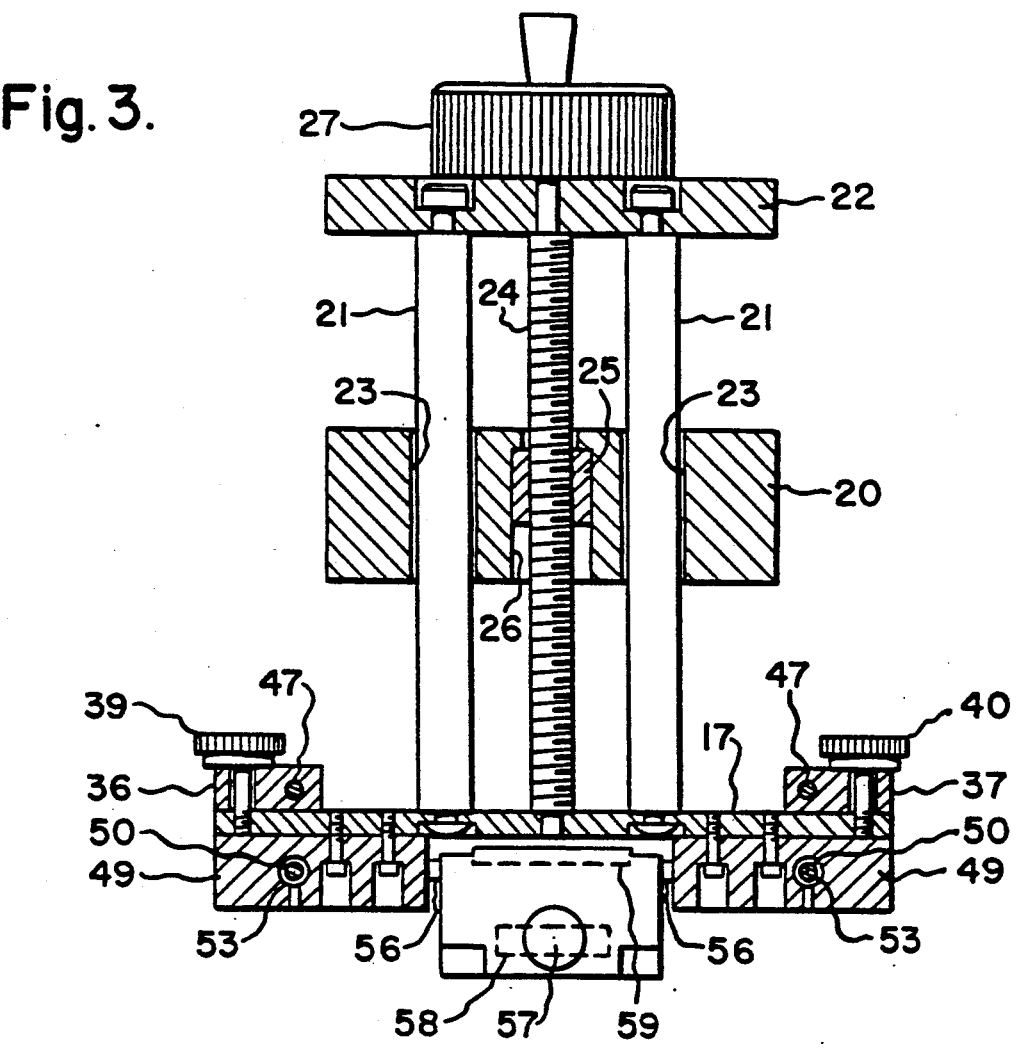
FIG. 3 is a sectional view along lines 3—3 of FIG. 2.

Referring now to FIGS. 2, 3, 4, 5, 6 and 7, frame 17 supports a plurality of elongated parallel rollers 18 each mounted to frame 17 by a rear bearing mount 19 and a front bearing mount 41 at opposite end of each roller. A carriage 20 is supported for vertical movement relative to frame 17 by guide bars 21 which are fixed at one end perpendicular to frame 17 and at the other end to plate 22. Guide bars 21 pass through complementary bores 23 extending through carriage 20. Threaded shaft 24 extends between frame 17 and plate 22 in cooperation with threaded nut 25 mounted in recess 26 of carriage 20. Manual rotation of shaft 24 via knob 27 moves carriage 20 to a selected position along guide bars 21. A second plurality of parallel rollers 28 are supported for rotation at one end by front bearing mounts 29 which are fixed to carriage 20 and at the other end by rear bear mounts 42. As shown in FIG. 2, each of the second plurality parallel rollers 28 are spaced such that each of the first plurality of parallel rollers 18 are verticle aligned intermediate rollers 28. A pair of swinging rollers 30 & 31 are mounted for rotation by bearings 48 on shaft 47. Shafts 47 are fixed to mounts, which are attached to opposite sides of the back of frame 17 by pivots 32 and 33. Releasable mounts 36 and 37 at the distal ends of the respective shafts 47 each have a knurled screw 39 and 40 for releasably securing the distal end of shafts 47 to opposite sides of the front of frame 17. Swinging rollers 30 and 31 maintain film 4 in close proximity to film stage 2 on either side of accumulator 11 when in the secured position.

Figure 8:
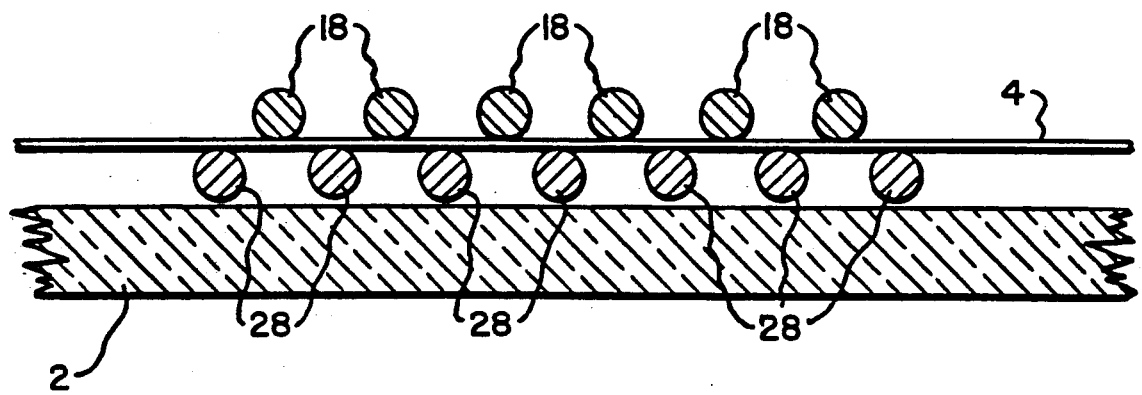
FIG. 8 is a view showing the straight through path for the film when the movable set of rollers are on one side of the fixed set of rollers.
Figure 9:
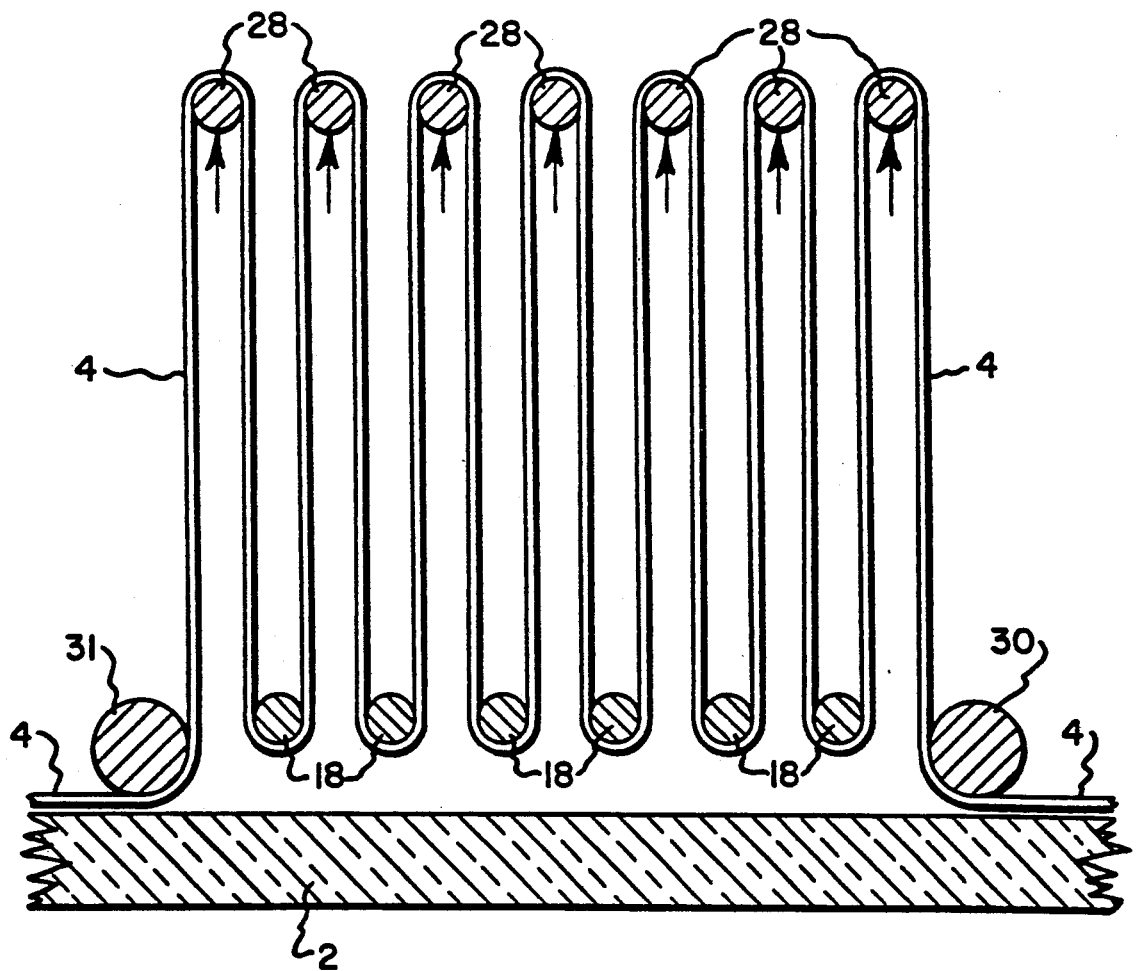
FIG. 9 illustrates the serpentine path when the movable set of rollers are on the other side of the fixed set of rollers.

In order to facilitate the loading of film 4 through accumulator 11, swinging rollers 30 & 31 are moved through their respective positions A, A' to an open position B and B'. Thereafter, threaded shaft 24 is rotated to move carriage 20 and associated rollers 28 to the lower most position. Referring to FIG. 8, it can be seen that when carriage 20 is in the lower most position, the tops of rollers 28 are positioned below the bottom of rollers 18. This alignment provides a planar gap between rollers 18 & 28, to permit film 4 to be fed into and through the accumulator along an essentially straight path. Referring back to FIG. 2 after the film has been loaded into the accumulator, swinging rollers 30 & 31 are returned to their secured position. Threaded shaft 25 is then rotated to raise carriage 20 and associated rollers 28 in order to adjust the spacing between complementary portions of first frame 10 and second frame 13. Referring to FIG. 9, it can be easily seen that the amount of film 4 accumulated between swinging roller 30 and swinging roller 31, can be varied by raising rollers 28 to different heights above rollers 18. Since film 4 will pass through a serpentine path, the total amount of film accumulated can be substantial. To assist in indicating the approximate length of the film stored in the accumulator, an indicator 43 (see FIG. 1) may be connected to carriage 20 through slot 44 in the front of cover 45. A scale 46 may be conveniently printed on the front of cover 45. Scale 46 may either refer to the length of the film accumulated in inches, in millimeters, or both, as well as have an indication of the appropriate setting for several different types of cameras.

Figure 4:
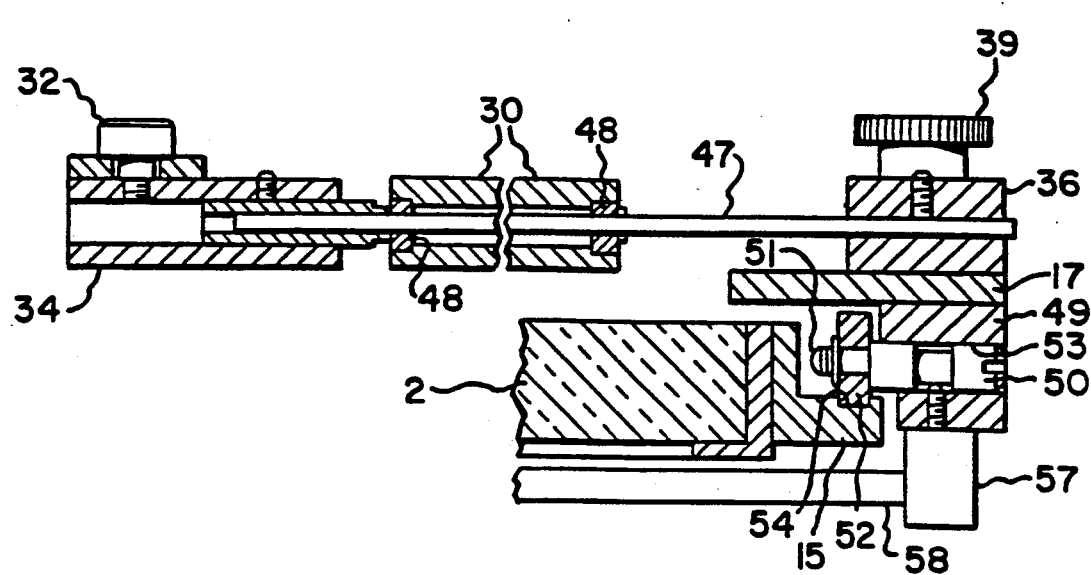
FIG. 4 is a sectional view along lines 4—4 of FIG. 2.

Referring now to FIG. 4, frame 17 has a sub-frame 49 affixed thereto. Each of a pair of slotted pins 50 carries an eccentrically mounted nipple 51 and associated bearing 52. Slotted pins 50 are mounted in complementary bores 53 and each of bearing 52 ride in longitudinal grove 54 in supporting guide 15 to facilitate moving accumulator 11 across table 1. Lateral and longitudinal leveling of accumulator 11 is achieved by rotation of slotted pins 50 and their eccentrically mounted bearings 52. The weight of the rear of accumulator 11 is supported by a pair of pads 55 preferably made of a low friction material such as nylon, polyethylene or teflon. Release 16 is pivotally mounted to sub frame 49 by protrusions 56 and carries a magnet 57. Magnet 57 releasably engages bar 58 attached to a stationary member of light table 1. Handle 59 is provided to facilitate operation of release 16 which pivots magnet 57 away from bar 58 when it is desireable to move accumulator 11 to another location along the table front.

What is claimed is:

1. A photographic film accumulator which comprises, a base, a first plurality of elongated, parallel rollers mounted to said base, said first plurality of rollers being spaced apart in a stationary plane, carriage means slidably mounted to said base for movement along a path perpendicular to said stationary plane, a second plurality of elongated, parallel rollers mounted to said carriage, said second plurality of rollers being spaced apart in a movable plane, positioning means for moving said carriage with said movable plane to a chosen location along said path, one location on said path positioning said movable plane on one side of said stationary plane for feeding a film end through said accumulator in a substantially straight line between said first and second plurality of rollers and a plurality of locations positioning said movable plane on the other side of said stationary plane for accumulating film along a serpentine path, whereby moving said carriage with said movable plane to a chosen location along said path achieves a chosen distance between selected portions of two photographs on a strip of film.

2. The accumulator according to claim 1, further including a pair of elongated rollers having a distal end and an attached end, the attached end of each of said pair being pivotally mounted to said base, the distal end of each of said rollers being releasably connectable to said base for positioning said rollers in a third plane parallel to said first plurality of rollers.

3. The accumulator according to claim 1, further including indicator means for displaying the amount of a film accumulated.

4. The accumulator according to claim 1, further including means for releasably fastening said accumulator to a light table.

5. The accumulator according to claim 1, wherein said positioning means includes guide means having a distal end, extending from said base for maintaining a parallel relationship between rollers in said stationary plane and rollers in said movable plane, a support mounted to the distal end of said guide means, a rotatable, threaded shaft extending between said base and said support, a threaded bore extending through said carriage and cooperating with said threaded shaft, whereby rotation of said shaft moves said carriage along said path.

6. The film accumulator according to claim 1, wherein said base is releasably connectable between two objectives of a comparison microscope.

7. In combination, a light table comprising a frame having a surface for supporting a film extending across said table in an image plane, film supply means mounted at one end of said table for providing photographs to be viewed, film takeup means mounted at the opposite end of said table for storing photographs after viewing, a microscope support fixed to said frame, and a film accumulator guide extending along one edge of said surface, a comparison microscope mounted to said microscope support comprising two optical systems, a first positionable objective means in one of said two systems for viewing a selected portion of a first photograph in said film, a second positionable objective means in the other of said two systems for viewing a selected portion of a second photograph in said film, said first and second objective means being spaced apart, and a film accumulator comprising, means to releasably connect said accumulator to said guide between said first and second objective means, means to provide a straight path to load film through said accumulator and means to provide a variable length serpentine film path through said accumulator between said first and second objective means, whereby different selected portions may be viewed without repositioning said first or second objective means as said film is transported from said supply to said takeup means.

8. The combination according to claim 7, wherein said means to provide a serpentine path includes a first plurality of elongated, parallel rollers, said first plurality of rollers being spaced apart in a stationary plane, a second plurality of elongated, parallel rollers, said second plurality of rollers being spaced apart in a plane moveable along a path perpendicular to said stationary plane, and positioning means for moving said movable plane to a chosen location along said perpendicular path.

9. The combination according to claim 8, wherein said means to provide a straight path to load film through said accumulator includes a location on said path positioning said movable plane on the other side of said stationary plane for feeding a film end through said accumulator in a substantially straight line between said first and second plurality of rollers.

10. The combination according to claim 7, wherein said guide is substantially non-magnetic with a magnetic portion positioned at a spot opposite said support and said means to releasably connect said accumulator includes a magnet for positioning said accumulator at said spot.

11. The combination according to claim 7, wherein said film accumulator is located between and in parallel spaced relationship with said film supply means and said film takeup means.

* * * * *